United States Patent Office 3,396,203
Patented Aug. 6, 1968

3,396,203
ALUMINO-SILICATE CATALYZED REACTIONS OF POLYCYCLIC AROMATIC HYDROCARBONS
Ronald D. Bushick, Glen Mills, Pa., assignor to Sun Oil Company, Philadelphia, Pa., a corporation of New Jersey
No Drawing. Filed Oct. 28, 1966, Ser. No. 590,225
16 Claims. (Cl. 260—668)

ABSTRACT OF THE DISCLOSURE

This invention relates to a method of converting symmetrical octahydrophenanthrene, also called octanthrene (hereinafter s-OHP), to its isomer, symmetrical octahydroanthracene, also called octhracine (hereinafter s-OHA), or s-OHA, to its isomer, s-OHP. This method comprises contacting a feed rich in one of the said isomers with an acidic alumino-silicate catalyst at a temperature above 80° C. but below cracking temperature, whereby isomerization of the contacted isomer to the other isomer occurs. The invention in another aspect relates to continuing said contacting until there has been produced at least one product selected from the group consisting of 1 - cyclohexyl - 2 - phenylethane (hereinafter, sometimes, CHPE), asymmetrical octahydroanthracene (hereinafter a-OHA), asymmetrical octahydrophenanthrene (hereinafter a-OHP), 1,2,3,4-tetrahydroanthracene (hereinafter THA), 1,2,3,4 - tetrahydrophenanthrene (hereinafter THP), anthracene, and phenanthrene.

The s-OHP/s-OHA isomerization is depicted as

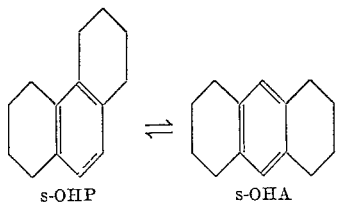

s-OHP      s-OHA

The structural formulae of the other above-mentioned products are as follows:

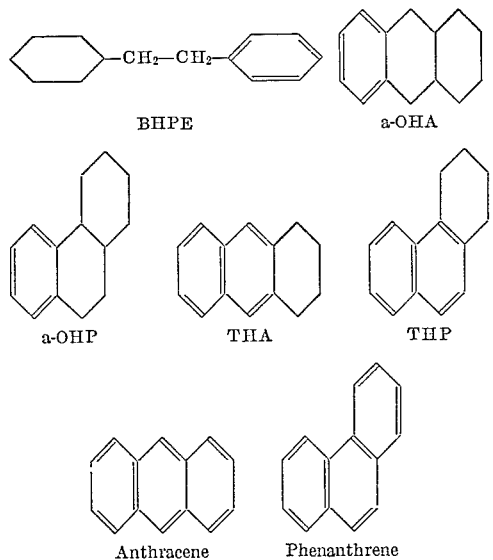

BHPE      a-OHA a-OHP      THA      THP

Anthracene      Phenanthrene

The various products which can be made by the invention have a variety of uses. They can be oxidized to polycarboxylic acids and acid anhydrides which can be condensed with glycols to make resinous polyesters. For example, as in Belgian Patent 635,872 of Dec. 2, 1963, s-OHA and s-OHP can be converted to pyromellitic acid and mellophanic acid, respectively, by nitric acid oxidation. s-OHA, s-OHP, a-OHA, a-OHP, THA and THP can be converted to acid anhydrides by vapor phase oxidation with oxygen and a catalyst such as $V_2O_5$, as in French Patent 1,426,897.

THA and THP can be reduced to anthracene and phenanthrene, respectively, as by passing over warm copper or over Pt on charcoal at about 300° C.

s-OHA, s-OHP, a-OHA, a-OHP, THA, THP, anthracene and phenanthrene and mixtures thereof can also be converted to foaming agents and detergents, as by the processes in Reichsamt Wirtschaftsausbau Chem. Ber. Prüf-Nr. 015(PB52017), 859–78 (1942) (see Chem. Abstracts 41: 6553g). They can also be transformed into synthetic beater sizes by condensation with polybasic acids or acid anhydrides, as in the processes Das Papier 6, 10–18 (1952), see Chem. Abstracts 46: 4793g.

THP, s-OHP, a-OHP, phenanthrene and mixtures thereof are useful as plasticizers, as for polystyrene (see U.S. 2,454,851 and U.S. 2,289,743). Such plasticizers need not be free of the corresponding anthracene isomers and the catalyst-free mixtures of isomers produced by the present invention can often be utilized directly as plasticizers without further processing.

The feed s-OHA or s-OHP or non-equilibrium mixtures thereof can be obtained by means disclosed in my copending application Ser. No. 534,428, filed Mar. 15, 1966, now U.S. Patent 3,336,407. For example, it is disclosed therein that tetralin can be converted in the presence of $HF-BF_3$ or $HF-BCl_3$ to s-OHA and s-OHP. Also, in my aforementioned U.S. patent application the isomerization of s-OHP to s-OHA and the isomerization of s-OHA to s-OHP, in the presence of $HF-BF_3$ or $HF-BCl_3$, is disclosed.

In the present invention, a feed comprising s-OHP or s-OHA or comprising a mixture of s-OHA and s-OHP is contacted with an acidic alumino-silicate catalyst at a temperature above 80° C. but below cracking temperature. The acidic alumino-silicate catalyst should contain, initially, less than about 12 percent by weight of water. As is shown hereinafter the nature of the products of my process can be altered by the presence of moisture in the catalyst. In some cases it is desirable that the catalyst contain less than 1 percent of water. One indication of the water content of the catalyst is the percent weight loss on ignition at 1050° F. for four hours, hereinafter sometimes referred to as percent LOI. For purposes of the present invention this ignition loss is assumed to represent water in the zeolite; however, a small proportion of this loss may be adsorbed molecules other than water, such as carbon dioxide or ammonia (in the case of a protonated catalyst prepared by ammonium-ion exchange).

The acidic alumino-silicate catalyst will have a pH less than 7 in 10 percent acqueous suspension at 20° C. and, preferably, will contain less than 3 percent of monovalent alkali metal cations, such as Na+.

The catalyst can be primarily crystalline or primarily amorphous or a combination thereof. For example, the catalyst can be a primarily amorphous acidic alumino-silicate such as the zeolites of U.S. 2,253,285, 2,302,277, 2,617,712, 2,763,622 and 2,767,148. The catalyst can also be primarily crystalline alumino-silicate such as the protonated zeolites prepared by exchange of hydrogen ion for the sodium ion in heulandite, analcite, chabazite, and such synthetic zeolites as the Type X zeolite of U.S. 2,822,244 and the zeolites of U.S. 3,200,083 which are denoted as Types Y and L. Other useful catalysts are those zeolite minerals, such as levynite, brewsterite, edgintonite, staurolite, and zoisite, which contain less than 2 percent of alkali metal cations.

Also useful as catalysts are crystalline alumino-silicate zeolites with amorphous binders wherein the monovalent alkali metal ions in the binder and in the crystalline zeolite are exchanged with H+ or polyvalent metal cations, such as the clay-bound zeolites of U.S. 3,158,579. Other useful catalysts are partially protonated, rare earth-exchanged crystalline zeolites in an amorphous silica-alumina matrix such as those of U.S. 3,140,251, 3,194,754, and 3,210,267.

Where the catalyst is to be regenerated by high temperature calcination, especially preferred catalysts are those crystalline alumino-silicate zeolites having an Al/Si atomic ratio from 0.65 to 0.2 and containing at least one trivalent or divalent metal, metal oxide, or metal hydroxide cation for every 12 atoms of aluminum in said alumino-silicate and wherein there is no more than one monovalent metal cation for every 12 atoms of aluminum in said alumino-silicate. Such catalysts are usually prepared by ion-exchange of solvated protons and/or polyvalent metal cations for alkali metal and/or other metal cations of such zeolites as analcite, chabazite, phillipsite, heulandite, Type Y of U.S. 3,013,984 and Type L of U.S. 3,013,984.

For example, suitable polyvalent metal cations are $Al^{+3}$, $Ni^{+3}$, $Ti^{+3}$, $V^{+3}$, $Mn^{+3}$, $Mo^{+3}$, $Ru^{+3}$, $Rh^{+3}$, $Sb^{+3}$, $La^{+3}$, $W^{+3}$, $Os^{+3}$, $Ir^{+3}$, $Bi^{+3}$, $Ce^{+3}$, $Pr^{+3}$, $Sm^{+3}$, $Gd^{+3}$, $Tb^{+3}$, $Dy^{+3}$, $U^{+3}$, $Mg^{+2}$, $Ca^{+2}$, $Ba^{+2}$, $Sr^{+2}$, $V^{+2}$, $Cr^{+2}$, $Mn^{+2}$, $Fe^{+2}$, $Co^{+2}$, $Ni^{+2}$, $Mo^{+2}$, $Ru^{+2}$, $Rh^{+2}$, $Pd^{+2}$, $Sn^{+2}$, $W^{+2}$, $Re^{+2}$, $Os^{+2}$, $Ir^{+2}$, $Pt^{+2}$, $Pb^{+2}$, $Sm^{+2}$, $Eu^{+2}$, $Gd^{+2}$, $Dy^{+2}$, $Yb^{+2}$, and the stable trivalent and divalent oxides and hydroxides of these metals, such as (for manganese), $Mo(OH)_3^{+3}$, $MoO(OH)^{+3}$, $Mo(OH)_2^{+3}$, $MoO^{+3}$, $MnO(OH)^{+3}$, $MnOH^{+3}$, $Mn(OH)_5^{+2}$, $MnO_2(OH)^{+2}$, $MnO(OH)_3^{+2}$, $Mn(OH)_4^{+2}$, $MnO(OH)_2^{+2}$, $MnO_2^{+2}$, $Mn(OH)_2^{+2}$, $MnO^{+2}$, $MnOH^{+2}$, or (for molybdenum) $Mo(OH)_3^{+3}$, $MoO(OH)^{+3}$, $Mo(OH)_2^{+3}$, $MoO^{+3}$, $MoOH^{+3}$, $Mo(OH)_4^{+2}$, $MoO(OH)_2^{+2}$, $MoO_2^{+2}$, $Mo(OH)_3^{+2}$, $MoO(OH)^{+2}$, $Mo(OH)_2^{+2}$, $MoO^{+2}$, $MoOH^{+2}$, or (for cerium) $CeOH^{+3}$, $CeOH^{+2}$, $Ce(OH)_2^{+2}$, $CeO^{+2}$.

For a given cation, the pH (or pK) of the exchange solution (and wash solutions) determines whether the exchanged species is the "bare cation" or a hydroxide. For activated zeolites the moisture content (as indicated by loss on ignition) determines whether exchanged hydroxide is present or was converted, by dehydration, to the oxide.

Where the final products desired are the result of hydrogen dismutation and/or hydrogen transfer, it is preferred that the acidic alumino-silicate catalyst contain from 0.05 to 5 percent of hydrogenation catalyst such as platinum, palladium, nickel, nickel oxide, nickel sulfide, molybdenum oxide, molybdenum sulfide, cobalt oxide, palladium oxide, and the like.

The hydrogenation catalyst, in finely-divided form, can be physically admixed with the acidic alumino-silicate, such as the catalysts of U.S. 3,173,853. The hydrogenation catalyst can also be incorporated into the alumino-silicate by salt impregnation, such as the catalysts of U.S. 2,507,864, 3,137,656, 3,186,935, and 3,236,762. Where the acidic alumino-silicate catalyst is crystalline it is preferred that the hydrogenation catalyst be introduced by ion exchange and/or be finely dispersed within the pores of the zeolite as in U.S. 2,971,904, 3,013,982, and 3,200,082. Where the hydrogenation catalyst is a free metal which is incorporated in a crystalline alumino-silicate it is preferred that the catalyst be pre-reduced, such as in U.S. 3,201,356. Hydrogenation catalysts comprising nickel, molybdenum, and oxides thereof can be sulfided as by $H_2S$ or hydrogen with $H_2S$ or $CS_2$ (see U.S. 3,173,854 and U.S. 3,166,491).

For optimum s-OHP/s-OHA isomerization the zeolite catalyst should be heated, preferably in a stream of flowing air, to reduce water and other volatile polar materials to less than 2 percent (as determined by percent LOI). Water may also be removed from the catalyst in situ, that is, by contacting the catalyst with liquid OHP and/or OHA at a temperature above the boiling point of water under conditions such that the water is removed from the reactor.

The catalyst can contain as much as 12 percent water when it is desired to further convert s-OHP and/or s-OHA to other products, such as a-OHA and a-OHP. Before initiating the reaction the water content of the catalyst can be increased by exposure to an atmosphere of controlled humidity. Water can also be added to the reactor in the course of the reaction, as by steam injection.

The reaction can be converted out in any convenient manner using equipment of conventional type. For example, an s-OHA and/or s-OHP starting material is charged to a closed reaction vessel equipped with heating and agitation means, such as a slurry reactor. The desired amount of the alumino-silicate catalyst and hydrocarbon feed are added and the vessel is then preferably shaken or the contents thereof otherwise agitated in order to insure efficient contact of the catalyst with the hydrocarbon. The reaction mass is heated to the reaction temperature and then maintained at the reaction temperature for sufficient time to allow conversion to occur. The pressure in the reactor is usually around atmospheric; however, the pressure can be below atmospheric (as about 3 mm. Hg) as where it is desired that the reaction be run at reflux below the atmospheric boiling temperature. The reaction can also be run at superatmospheric pressure, such as autogenous pressure below the cracking temperature.

At the end of the reaction period the reaction vessel contains catalyst, s-OHA, and s-OHP and side products, the nature and amount of said side products being controlled by the type of catalyst, reaction temperature and contact time (as is shown hereinafter).

The alumino-silicate catalyst is separated from the hydrocarbons in the reaction product, as by filtration. When present in the reaction product, anthracene (which melts at 214° C.) can be separated therefrom by crystallization. The s-OHA and s-OHP can be separated from the other organic materials by means described in my aforementioned application Ser. No. 534,428. For example, s-OHA and s-OHP can be distilled off, such as, at about 167° C. at 12 mm. Hg or at about 80–85° C. and 0.1 mm. Hg. The distillate can also contain THP, a-OHA and a-OHP if these are present in appreciable amount in the reaction mixture.

The hot distillate is cooled to below about 74° C. to recover relatively pure crystalline s-OHA which is separated, for example, by filtration. The separated s-OHA, which is relatively pure s-OHA because its purity is substantially higher than the s-OHA content of the reaction mixture, can be further purified by recrystallization from an alcohol such as methanol at room temperature.

If the reaction product did not contain appreciable amounts of a-OHA and a-OHP, the filtrate is a liquid mixture of s-OHP and a relatively small amount of s-OHA which mixture can either be recycled, if further conversion to OHA is desired, or be further purified by crystallization. When a-OHA is present it can be recovered from the filtrate by crystallization below about 64° C. When THP is present in the filtrate it can be recovered by distillation as at about 300–310° C. and 735 mm. Hg.

When present in the reaction product, THA can be recovered from the reaction product or from the distillation bottoms by crystallization at below 88° C. and THP can be recovered from the bottoms by distillation, as at about 300–310° C. and 735 mm. Hg.

Phenanthrene, s-OHP, a-OHP, and THP can be separated from anthracene, s-OHA, a-OHA, and THA by selective adsorption using molecular sieves, such as by the process of U.S. 2,967,896.

Anthracene can also be recovered by the use of maleic anhydride as in U.S. 2,440,688 or by use of selective solvents as in U.S. 2,828,346 and U.S. 2,783,287.

The reaction can also be run in liquid, vapor or trickle phase utilizing a fixed bed of granular catalyst. For example, a suitable catalyst for such a bed comprises a CeHY zeolite containing at least 7% (preferably 12%) Ce and less than 1% Na, prepared by calcination (for 4 hours at about 400° C. in flowing air) of extruded 1/16″ diameter X 1/16″ long cylinders of CeNH₄ Y zeolite in about 25% of an acidic amorphous alumino-silicate binder. The CeNH₄ Y zeolite is prepared by aqueous exchange with 1.5% $Ce(NO_3)_3 \cdot 6H_2O$ of an NH₄ Y zeolite containing less than 1.2% Na, prepared by ammonium-ion exchange of a sodium Y zeolite.

The following examples illustrate the s-OHP/s-OHA isomerization by means of an acidic alumino-silicate catalyst and the conversion thereof, by further contacting, to CHPE, a-OHA, a-OHP, THA, THP, anthracene, and phenanthrene. Also shown is the effect of the previously discussed reaction conditions upon the yield of product. The procedure in each run is essentially the same and is as follows:

The reaction vessel is a flask equipped with a condensor, drying tube, stirrer, thermometer, and an electric heating mantle. Ten milliliters of s-OHP and 4.5 grams of the catalyst (ground to 200 mesh) are placed in the flask and heated, with agitation, until the desired reaction temperature is reached. The temperature is then maintained and 0.2 ml. samples of the catalyst-free reaction product are removed each hour and analyzed by vapor phase chomatography.

Examples I–VII are made with a substantially anhydrous, acidic crystalline alumino-silicate zeolite which is partially protonated and which also contains polyvalent rare earth metal cations (hereinafter referred to as REHY). Examples I and II show the effects of contacting s-OHP with a low ignition loss REHY catalyst at 100° C. for one hour and five hours respectively. Examples III and IV are similar to Examples I and II respectively except that the reaction temperature is 200° C. Example V is similar to Example III except that the catalyst is subjected to a programmed heat activation which reduces its loss on ignition to less than 1%. Examples VI and VII are similar to Examples III and IV except that the catalyst is exposed to controlled humidity of 50% at 70° F. for 20 minutes and picks up sufficient water to have a loss on ignition of 8.0%. Examples VIII and IX are similar to Examples III and IV except that the catalyst is a protonated Y zeolite containing 0.5% palladium, partially in the oxide form (hereinafter referred to as HY(Pd)). Examples X and XI are similar to Examples III and IV respectively except that the catalyst is a calcium-exchanged sodium Y zeolite containing 0.5% platinum (hereinafter referred to as CaY(Pt)). Examples XII and XIII are similar to Examples IX and XI respectively except that the reaction temperature is 100° C. Examples XIV and XV are similar to Examples III and IV respectively except that the catalyst is an acidic amorphous silica-alumina catalyst which has cracking activity (hereinafter referred to as S–A). Example XVI is similar to Example XV except that the catalyst is a protonated rare earth-exchanged crystalline Y zeolite in a kaolin binder. Example XVII shows that at 195° C., REHY catalyst converts tetralin to phenyl tetrylbutane. Example XVIII shows that when "used" catalyst is first contacted with fresh feed, the the overall catalyst activity decreases and selectivity increases for s-OHP/s-OHA isomerization (i.e., decreased side reactions). In these examples all percentages are by weight.

Example I s-OHP is contacted for one hour at 100° C. with REHY catalyst in the manner described above. 10.2 percent of the s-OHP is isomerized to s-OHA and 2 percent s-OHP is converted to other hydrocarbons, primarily THA and THP. The REHY catalyst has an atomic ratio Al/Si of 0.44 and contains (ignited basis) 1.6% Na and 7.8% mixed rare earth ions of which 41% is lanthanum and 5% is cerium. The catalyst is prepared by exchanging sodium zeolite Y with a solution of ammonium chloride and a didymium chloride, then washing and, finally, calcining at 950° F. to remove water and ammonia.

Example II

The contacting of Example I is continued for four additional hours, that is, for a total catalyst/feed contact time of 5 hours. 20.8 percent of the s-OHP is converted to s-OHA and 4.6 percent of the s-OHP is converted to other hydrocarbons, primarily THA, THP, a-OHA and a-OHP.

Example III

Example I is repeated except that the reaction temperature is 200° C. The catalyst-free reaction mixture contains 37.6 percent s-OHA and 32.3 percent other hydrocarbons, about half of which are a-OHA and a-OHP.

Example IV

The contacting of Example III is continued for four additional hours, that is, for a total catalyst/feed contact time of five hours. 20.5 percent of the catalyst-free reaction mixture is s-OHA and 64.3 percent is other hydrocarbons, primarily a-OHA, a-OHP, complex polycyclic hydrocarbons (hereinafter CPC), and a CHPE-containing fraction (hereinafter referred to as CHPE+). 8.7 percent of the reaction mixture is tetralin.

Example V

Example III is repeated except that the catalyst is activated by controlled heating in a stream of flowing air at 230° C. for 1 hour, then the temperature is raised at the rate of about 10° C. per minute to a temperature of 400° C. and maintained at 400° C. for 2 hours, then the heat is removed and the activated catalyst cooled in a slowly flowing stream of dry air. The resulting activated acidic protonated rare earth-containing Y zeolite has less than 1% loss on ignition. The catalyst-free reaction product after 1.5 hour of contact at 200° C. analyzes 46.6 percent s-OHA and 19.4 percent other hydrocarbons, primarily a-OHA and a-OHP.

Example VI

Example III is repeated except that the catalyst is exposed to controlled humidity of 50% at 70° F. for 20 minutes. After this exposure the catalyst has an ignition loss of 8.0%. The catalyst-free reaction product after 1 hour of contact at 200° C. analyzes 33.7% s-OHA and 40.2% other hydrocarbons, primarily a-OHA, a-OHP, THA, THP, and CHPE+.

Example VII

The contacting of Example VI is continued for 4 additional hours, that is, for a total catalyst/feed contact time of 5 hours. 11.5% of the catalyst-free reaction mixture is s-OHA and 80.5% is other hydrocarbons. The a–OHA+a–OHP and THA+THP contents of the reaction mixture are similar to those in Example VI; however, the amounts of tetralin, CHPE+, and complex polycyclics (CPC) are significantly greater than in Example VI. This tends to indicate, with this catalyst in the presence of water, that after one hour a–OHA, a–OHP, THA, and THP are at equilibrium concentrates and that further contacting promotes ring fusion, ring fission and hydrogen transfer. The high conversion to tetralin indicates that at lower temperatures in the presence of the proper amount of water, REHY catalyst can be used to convert tetralin to more highly condensed polycyclic materials, such as s–OHA and s–OHP.

Example VIII

Example III is repeated except that the catalyst is a protonated type Y zeolite analyzing, ignited basis, 1.5%

Na$_2$O and 0.5% Pd (partially in oxide form). This Hy(Pd) catalyst is prepared from sodium zeolite Y, by a procedure similar to that of U.S. 3,159,565. After one hour of contacting the catalyst-free reaction mixture contains 23.2% s–OHA and 59.1% other hydrocarbons, primarily a–OHA, a–OHP, THA, THP, CPC, and CHPE+.

Example IX

The contacting of Example VIII is continued for a total catalyst/feed contact time of 5 hours. 12.7% of the catalyst-free reaction mixture is s–OHA and 79.2% is other hydrocarbons. The amounts of THA+THP and a–OHA+a–OHP are less than in Example VIII, indicating that THA, THP, a–OHA and a–OHP are converted to other hydrocarbons by the HY(Pd) catalyst. The reaction mixture contains significantly greater amounts of anthracene and phenanthrene (AN+Ph) and considerably less tetralin than the product in Example VII, due to the hydrogenation promoting component of the HY(Pd) catalyst.

Example X

Example III is repeated except that the catalyst is a calcium Y zeolite containing 0.5% Pt (partially in oxide form). This CaY(Pt) zeolite is prepared from sodium zeolite Y by a procedure similar to that of U.S. 3,236,762 and analyzes, ignited basis, 1.5% Na$_2$O and 10.5% CaO. After 1 hour of contacting, the catalyst-free reaction mixture contains 32.1% s–OHA and 9.0% other hydrocarbons, primarily THA and THP.

Example XI

The contacting of Example X is continued for a total of 5 hours catalyst/feed contact time. 39.8% of the catalyst-free reaction mixture is s–OHA and 25.6% is other hydrocarbons, 78% of these other hydrocarbons being THA+THP. Therefore, at 200° C. the CaY(Pt) catalyst is very selective for producing s–OHA, THA and THP in reasonable yield from s–OHA.

Example XII

Example IX is repeated except that the reaction temperature is 100° C. 1.7% of the catalyst-free reaction mixture is s–OHA and 1.4% is other hydrocarbons.

Example XIII

Example XI is repeated except that the reaction temperature is 100° C. 3.4% of the reaction mixture is s–OHA and 3.1% is other hydrocarbons.

Example XIV

Example III is repeated except that the catalyst is a calcined, acidic amorphous alumino-silicate analyzing less than 0.5% Na, 89% SiO$_2$, and 11% Al$_2$O$_3$. After 1 hour of contacting, 14% of the catalyst-free reaction mixture is s–OHA and 1% is other hydrocarbons.

Example XV

The contacting of Example XIV is continued for a total catalyst/feed contact time of 3 hours. The catalyst-free reaction mixture contains 33% of s–OHA and 2% other hydrocarbons. This shows the acidic amorphous aluminosilicate catalyst to be very selective for converting s–OHP to s–OHA in reasonable yield. It also indicates that this catalyst is selective for the reverse reaction in the s–OHA/s–OHP equilibrium, namely, the conversion of s–OHA to s–OHP.

Example XVI

Example III is repeated except that the catalyst is one part by weight of a substantially anhydrous protonated rare earth-containing Y zeolite and 9 parts by weight of substantially sodium-free, acid-exchanged kaolin binder. After 2 hours of catalyst/feed contact, 6.6% of the catalyst-free reaction mixture is s–OHA and 4.4% is other hydrocarbons.

Table I further characterizes the products obtained in the previous examples. In Table I, "CHPE+" signifies a hydrocarbon fraction containing at least 20% of 1-cyclohexyl-2-phenylethane, the remainder being hydrocarbons of similar structure. "a–OHA+a–OHP" denotes a hydrocarbon mixture containing at least 60% a-OHA and a-OHP. "THA+THP" signifies a mixture of THA and THP. "An+Ph" signifies a mixture of anthracene and phenanthrene. "Conv." signifies conversion and "Percent Conv. SP" is percent conversion to side products, that is, products other than s–OHA.

TABLE I

| Example No. | 6 | 7 | 3 | 4 | 5 | 8 | 9 | 10 |
|---|---|---|---|---|---|---|---|---|
| Catalyst Type | REHY | REHY | REHY | REHY | REHY | HY(Pd) | HY(Pd) | CaY(Pt) |
| Percent LOI | 8.0 | 8.0 | 2.2 | 2.2 | <1.0 | | | |
| Time (Hrs.) | 1 | 5 | 1 | 5 | 1.5 | 1 | 5 | 1 |
| Temp. (° C.) | 200 | 200 | 200 | 200 | 200 | 200 | 200 | 200 |
| Percent Total Conv. | 73.9 | 92.0 | 69.9 | 84.8 | 66.0 | 82.3 | 91.9 | 41.1 |
| Percent s–OHA | 33.7 | 11.5 | 37.6 | 20.5 | 46.6 | 23.2 | 12.7 | 32.1 |
| Percent Tetralin | 3.6 | 16.0 | 2.3 | 8.7 | 1.1 | 3.5 | 7.9 | 0.0 |
| Percent CHPE+ | 8.7 | 20.3 | 6.6 | 15.6 | 4.1 | 10.0 | 19.4 | 0.0 |
| Percent (a–OHA+a–OHP) | 18.0 | 18.8 | 15.2 | 19.5 | 11.3 | 19.0 | 17.6 | 0.9 |
| Percent (THA+THP) | 5.8 | 6.3 | 4.7 | 6.9 | 2.9 | 16.3 | 14.0 | 7.3 |
| Percent (An+Ph) | 0.3 | 2.0 | 0.0 | 0.0 | 0.0 | 3.8 | 7.3 | 0.8 |
| Percent CPC | 3.8 | 17.1 | 3.5 | 1.36 | 0.0 | 6.5 | 12.0 | 0.0 |
| Percent s–OHA/s–OPH | 1.30 | 1.44 | 1.25 | 1.35 | 1.37 | 1.32 | 1.39 | 0.55 |
| Percent s–OHA/Percent Total Conv. | 0.46 | 0.13 | 0.54 | 0.24 | 0.71 | 0.28 | 0.14 | 0.78 |
| Percent Conv. SP | 40.2 | 80.5 | 32.3 | 64.3 | 19.4 | 59.1 | 79.2 | 9.0 |
| Percent Conv. SP/Percent Total Conv. | 0.54 | 0.87 | 0.46 | 0.76 | 0.29 | 0.72 | 0.86 | 0.22 |

| Example No. | 11 | 14 | 15 | 1 | 2 | 13 | 12 | 16 |
|---|---|---|---|---|---|---|---|---|
| Catalyst Type | CaY(Pt) | S-A | S-A | REHY | REHY | CaY(Pt) | HY(Pd) | REHY-K |
| Percent LOI | | | | 2.2 | 2.2 | | | 4.0 |
| Time (Hrs.) | 5 | 1 | 3 | 1 | 5 | 5 | 5 | 2 |
| Temp. (° C.) | 200 | 200 | 200 | 100 | 100 | 100 | 100 | 100 |
| Percent Total Conv. | 65.4 | 15 | 35 | 12.2 | 25.4 | 6.5 | 3.1 | 11.0 |
| Percent s–OHA | 39.8 | 14 | 33 | 10.2 | 20.8 | 3.4 | 1.7 | 6.6 |
| Percent Tetralin | 0.0 | | | 0.0 | 0.0 | | | |
| Percent CHPE+ | 0.2 | | | 0.0 | 0.0 | | | |
| Percent (a–OHA+a–OHP) | 2.5 | | | 0.4 | 1.7 | 1.1 | 0.5 | |
| Percent (THA+THP) | 20.0 | | | 1.5 | 2.8 | 1.7 | 0.9 | |
| Percent (An+Ph) | 2.9 | | | 0.1 | | 0.3 | | |
| Percent CPC | 0.0 | | | 0.0 | 0.0 | | | |
| Percent s–OHA/s–OPH | 1.15 | 0.16 | 0.51 | 0.11 | 0.28 | 0.04 | 0.02 | 0.07 |
| Percent s–OHA/Percent Total Conv. | 0.61 | 0.93 | 0.94 | 0.84 | 0.82 | 0.52 | 0.55 | 0.60 |
| Percent Conv. SP | 25.6 | 1 | 2 | 2.0 | 4.6 | 3.1 | 1.4 | 4.4 |
| Percent Conv. SP/Percent Total Conv. | 0.39 | 0.07 | 0.06 | 0.16 | 0.18 | 0.48 | 0.45 | 0.40 |

In summary, Examples I to XVI are illustrative of my method of conversion of a s-OHP to its isomer, s-OHA, comprising contacting a feed rich in s-OHP with an acidic alumino-silicate catalyst at a temperature above 80° C. but below cracking temperature. Since this isomerization is an equilibrium reaction, the examples also indicate that, with a feed which is rich in s-OHA, my method can be used to effect the conversion of s-OHA to s-OHP.

In Table I, the ratio s-OHA/s-OHP for the products of the examples shows that, at 200° C., this ratio at equilibrium is in the range of 1.3 to 1.5. Therefore, mixtures of s-OHP and s-OHA which have s-OHA/s-OHP greater than about 1.5 are rich in s-OHA in that my method can be used to convert such s-OHA-rich mixtures to "equilibrium mixtures" of s-OHA and s-OHP. Conversely, when the s-OHA/s-OHP ratio is less than about 1.3 the mixture is rich in s-OHP (in relationship to an equilibrium mixture at 200° C.).

The ratio s-OHA/Total Conv. in Table I shows that acidic amorphous silica-alumina (S-A) is preferred when one wishes to minimize side reactions when producing s-OHA from s-OHP. However, a greater degree of conversion, in a given period of time, can be obtained at 200° C. with a CaY(Pt) catalyst or with an REHY catalyst having less than 1.0% LOI when moderate amounts of side products (particularly THA+THP with the CaY(Pt) and a-OHA+a-OHP with the REHY) are not objectionable.

Where it is desired to further convert s-OHP/s-OHA mixtures to products such as CHPE, a-OHA, a-OHP, THA, THP, anthracene, or phenanthrene, the catalyst should comprise an acidic crystalline alumino-silicate zeolite. With the REHY zeolite, both percent total conversion and percent conversion to side products increase as the percent LOI increases; therefore, the presence of water promotes the formation of side products. Similarly, a comparison (in Table I) of the products obtained at 200° C. with REHY, HY(Pd), or CaY(Pt) shows that both total conversion and conversion to side products are enhanced by zeolite protonation. Of the catalysts in the examples, both total conversion and conversion to side products in the first hour of reaction time are greatest with the HY(Pd), which is representative of those crystalline alumino-silicate zeolites which are at least 25% protonated and which contain less than one atom of monovalent metal cations for each atom of aluminum (such zeolites can also contain polyvalent metal cations, such as Ce$^{+3}$, in order to preserve crystallinity when they are subjected to high temperature, as in oxidative regenerative). Especially preferred at reaction temperatures below about 100° C. are those crystalline zeolites wherein the Al/Si ratio is from 0.65 to 0.35, which are at least 25% protonated, which contain at least one rare earth metal cation for every 9 aluminum atoms and which contain less than one atom of monovalent metal cations for each atom of aluminum.

Example XVII

Example III is repeated except that tetralin is substituted for the s-OHP feed and the reaction temperature is 195° C. After 40 minutes catalyst/feed contact, the catalyst-free reaction mixture contains 5.5% phenyl butyl tetralin and 1.5% other hydrocarbons, some of which are s-OHA and s-OHP. This shows that (in contrast to the catalyst of my aforementioned application Ser. No. 534,428) REHY with a low water content is not a preferred catalyst for converting tetralin to s-OHA and s-OHP.

Example XVIII

Example VIII is repeated except that the liquid hydrocarbon reaction product is separated from the HY(Pd) catalyst by decanting, after one hour of contacting, and is removed from the reactor. A fresh 10 ml. charge of s-OHP is added to the reactor, brought to temperature and contacted with the catalyst for 1 hour. The catalyst-free reaction product of this second s-OHP charge contains 40.2% s-OHA and 25.6% other hydrocarbons. After 3 more such cycles of product removal and addition of fresh OHP, the catalyst-free reaction product contains 51.7% s-OHA and 10.6% other hydrocarbons. Table II further characterizes the products obtained in the second through the fifth cycles of this example.

TABLE II

| Cycle Number | 2 | 3 | 4 | 5 |
|---|---|---|---|---|
| Percent Total Conversion | 65.8 | 61.8 | 58.7 | 62.3 |
| Percent s-OHA | 40.2 | 46.4 | 45.3 | 51.7 |
| Percent Tetralin | 1.6 | 0.9 | 0.6 | 0.5 |
| Percent CHPE+ | 3.1 | 1.9 | 1.7 | 1.2 |
| Percent (a-OHA+a-OHP) | 8.9 | 5.8 | 5.1 | 4.3 |
| Percent (THA+THP) | 9.5 | 5.9 | 5.3 | 4.3 |
| Percent An+Ph | 1.0 | 0.4 | 0.4 | 0.3 |
| Percent CPC | 1.6 | 0.5 | 0.3 | 0.0 |
| Ratio s-OHA/s-OHP | 1.18 | 1.22 | 1.10 | 1.37 |
| Ratio s-OHA/Total Conv. | 0.61 | 0.75 | 0.77 | 0.83 |

NOTE.—Run at 1 atmosphere, 200° C., HY(Pd) catalyst. Liquid reaction mixture completely removed every hour and replaced with fresh s-OHP charge.

When Example VIII of Table I is compared with Table II, it can be seen that overall catalyst activity, as measured by percent total conversion of s-OHP, decreases considerably after the first cycle. However, this decrease in overall activity is accompanied by greater selectivity for producing s-OHA from s-OHP. Even in the fifth cycle the catalyst remains sufficiently active to give a high degree of overall s-OHP conversion.

Similar results are obtained when five such cycles are made with the 2.2% ignition loss REHY catalyst of Examples III and IV (total conversion per cycle, after the first cycle, being from 50–60% with 40–50% of the catalyst-free reaction mixture being s-OHA).

Such high yields of s-OHA from the second through fifth charge of s-OHP indicate that for s-OHP/s-OHA isomerization the acidic crystalline alumino-silicate catalyst can have a long useful life before regeneration (as by burning in air to remove hydrocarbon poisons) is required; however, when products other than s-OHA and s-OHP are desired, regeneration is preferred between each fresh charge of feed.

Where s-OHA or s-OHP is the principal product desired, it is preferred that, after a suitable contact period, the desired isomer be recovered from the isomerization mixture and the resulting depleted isomerization mixture be further contacted with the catalyst in order to maximize production of the desired isomer.

The invention claimed is:

1. Method of converting s-OHP to its isomer, s-OHA, or s-OHA to its isomer, s-OHP, which comprises contacting a feed rich in one of the said isomers with an acidic alumino-silicate catalyst at a temperature above 80° C. but below cracking temperature, whereby isomerization of the contacted isomer to the other isomer occurs.

2. Method according to claim 1 wherein said other isomer is recovered from the isomerization mixture.

3. Method of claim 2 wherein after recovery of said other isomer the resulting depleted isomerization mixture is further contacted with said catalyst.

4. Method according to claim 1 wherein said acidic alumino-silicate catalyst comprises a crystalline zeolite.

5. Method according to claim 4 wherein said contacting is effected in the presence of from 2 to 12 percent of water, based on the weight of said catalyst.

6. Method according to claim 1 wherein said catalyst has an Al/Si atomic ratio of from 0.65 to 0.2 and contains at least 1 trivalent or divalent metal, metal oxide or metal hydroxide cation for every 12 atoms of aluminum in said alumino-silicate.

7. Method according to claim 6 wherein said cation comprises at least one rare earth.

8. Method which comprises converting s-OHP to s-OHA or s-OHA to s-OHP in accordance with claim 4 and continuing said contacting until there has been produced at least one product selected from the group consisting of 1-cyclohexyl-2-phenylethane, a-OHA, a-OHP, THA, THP, anthracene, and phenanthrene.

9. Method according to claim 8 wherein said contacting is effected in the presence of from 2 to 12 percent of water based on the weight of said catalyst.

10. Method according to claim 8 wherein at least 7 percent of the product of said conversion is THA or THP or mixtures thereof and wherein said catalyst contains from 0.05 to 5.0 percent of a metal which is a hydrogenation catalyst.

11. Method according to claim 10 wherein said catalyst is at least 25 percent protonated and contains less than one atom of monovalent metal cations for each atom of aluminum.

12. Method according to claim 11 wherein said contacting is effected in the presence of from 2 to 12 percent of water based on the weight of said catalyst.

13. Method according to claim 8 wherein said contacting is continued until there is present in the reaction mixture at least 5 percent of anthracene, or phenanthrene, or a mixture thereof.

14. Method according to claim 13 wherein said catalyst contains from 0.2 to 2.0 percent of a metal or metal oxide which catalyzes hydrogenation.

15. Method according to claim 14 wherein said metal which catalyzes hydrogenation is platinum or palladium.

16. Method according to claim 15 wherein said contacting is effected in the presence of from 2 to 12 percent of water, based on the weight of said catalyst.

References Cited

UNITED STATES PATENTS 2,416,965  3/1947  Thomas et al.
2,416,966  3/1947  Thomas et al.

DELBERT E. GANTZ, *Primary Examiner.*

C. R. DAVIS, *Assistant Examiner.*